United States Patent
Hadland

[15] 3,700,291
[45] Oct. 24, 1972

[54] TWO DEGREE INVERTED FLEXURE

[72] Inventor: Wayne O. Hadland, San Jose, Calif.

[73] Assignee: The United States of America as represented by the Administrator of the National Aeronautics and Space Administration

[22] Filed: Oct. 29, 1971

[21] Appl. No.: 193,671

[52] U.S. Cl. ...................308/2 A, 74/5 F, 287/85 R
[51] Int. Cl. ...............................................F16c 11/00
[58] Field of Search..................308/2 A, 2 R; 74/5 F; 287/85 R

[56] References Cited

UNITED STATES PATENTS

| | | | |
|---|---|---|---|
| 3,288,541 | 11/1966 | Tracy | 308/2 A |
| 3,394,970 | 7/1968 | Tracy | 287/85 R |
| 3,384,424 | 5/1968 | Raines | 287/85 R |
| 3,063,670 | 11/1962 | Young | 74/5 F |

*Primary Examiner*—Martin P. Schwadron
*Assistant Examiner*—R. H. Lazarus
*Attorney*—Darrell G. Brekke et al.

[57] ABSTRACT

An inverted flexure is provided having two degrees of freedom which can be made from a single block of material by simple drilling and sawing operations. The flexural axis of either or both planes can be located either on or off the geometric center of the device.

6 Claims, 11 Drawing Figures

Patented Oct. 24, 1972
3,700,291
3 Sheets-Sheet 1
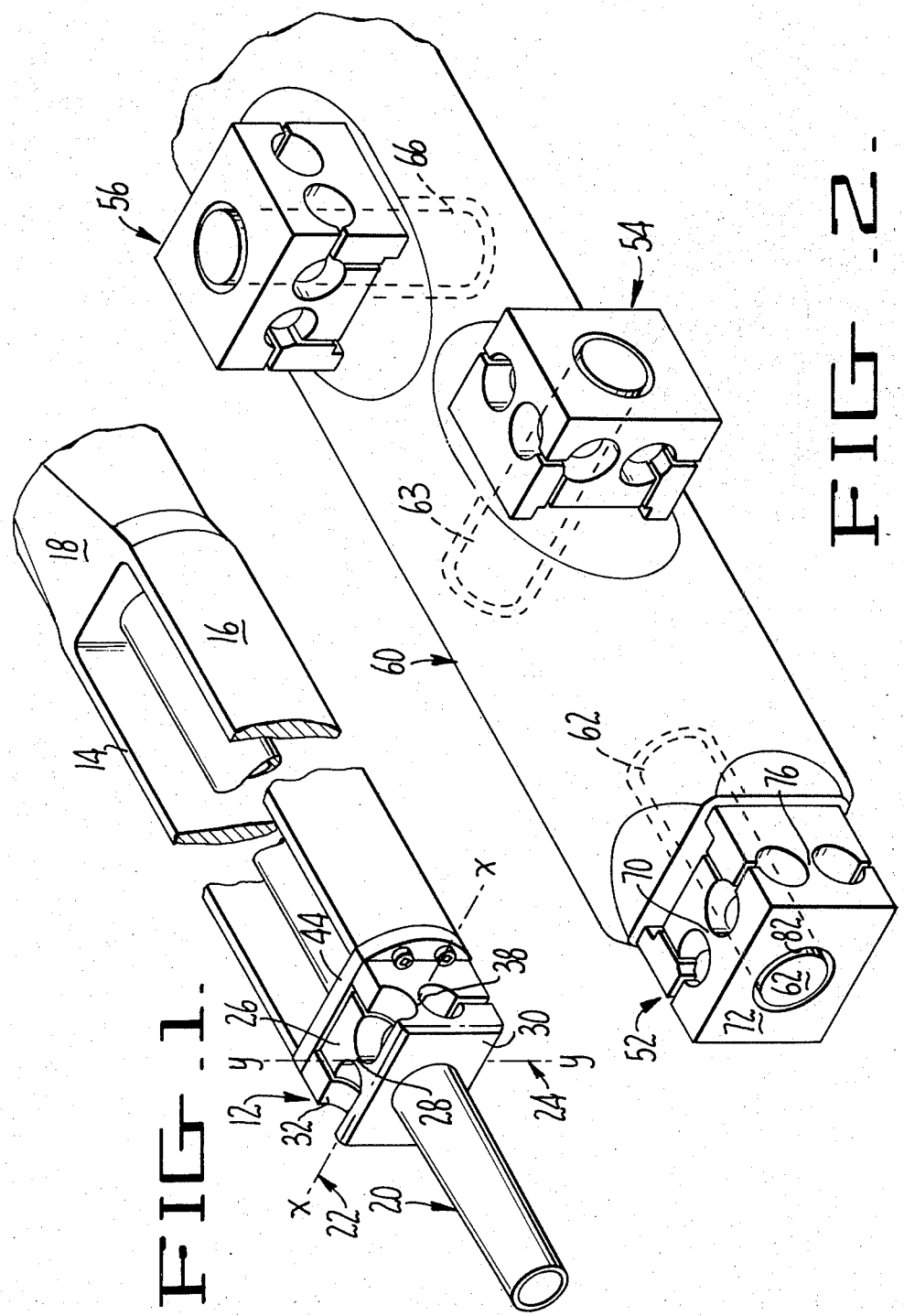
WAYNE O. HADLAND
INVENTOR.
BY
ATTORNEY

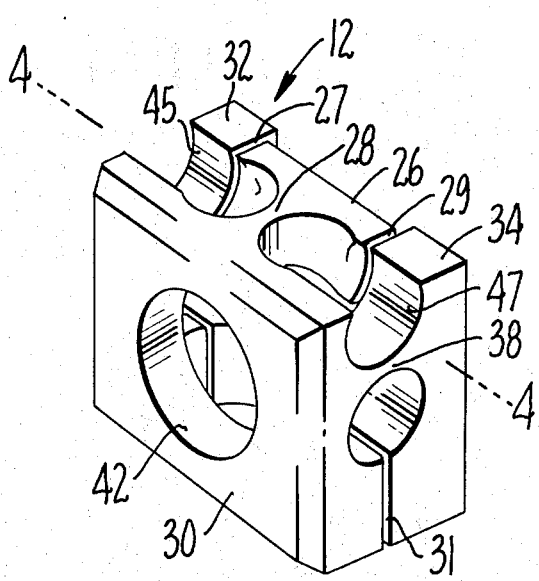
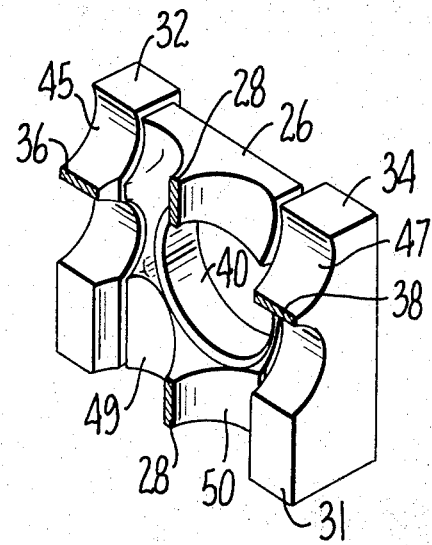
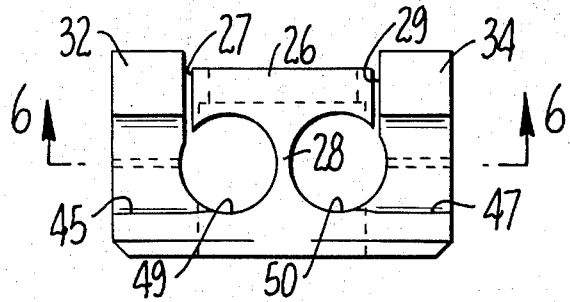
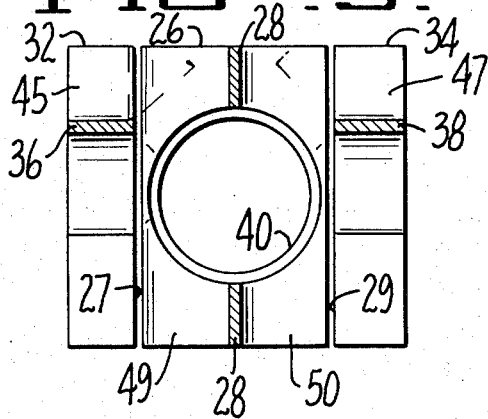
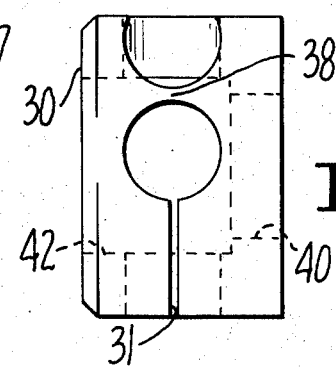
WAYNE O. HADLAND
INVENTOR.
ATTORNEY Patented Oct. 24, 1972

WAYNE O. HADLAND
INVENTOR.

BY
ATTORNEY

TWO DEGREE INVERTED FLEXURE

The invention described herein was made by an employee of The United States Government and may be manufactured and used by or for The Government for Governmental purposes without the payment of any royalties thereon or therefor.

SUMMARY OF THE INVENTION

Flexures are well known in the art and can be used for a variety of purposes such as positioning of magnetometers, lasers and telescopes and for mounting models in wind tunnels. The device of the present invention is particularly adapted for mounting aeroelastic or otherwise non-rigid models wherein the model may flex during testing. It will be obvious to those skilled in the art that the flexure joint of the present invention is not limited to these particular applications but is one of broad applicability.

Flexure joints have been well known in the past but have suffered from a number of disadvantages. Some of the proposed flexures have been complicated to construct and have required expensive materials. In some instances it has been necessary to provide external limit stops which further complicate the structure. Other devices have suffered from the fact that they lack stiffness in the remaining degrees of freedom.

One of the most common disadvantages of prior art structures is that the mechanical connections must be made from opposite sides of the device, complicating mounting, particularly when the device to be mounted is concentric with the holding fixture. Another deficiency with structures of the prior art is that the flexural axis must ordinarily coincide with the geometric axis and also the compliance of both axes is the same.

In accordance with the present invention, all of the above disadvantages are overcome. The device of the present invention is easily manufactured without the use of special fixtures, basically utilizing only simple boring and sawing tools. A small amount of milling may be required on certain embodiments of the invention for special applications. Low cost materials can be used and only a single piece of material is required. Because of its symmetry the device of the present invention has good thermal stability.

With the device of the present invention, it is not necessary to provide external limit stops but the design of the structure itself inherently provides such stops.

The device of the present invention has excellent stiffness in the four remaining degrees of freedom so that good support is given to an article which is mounted thereon.

The device of the present invention is basically an inverted flexure in that the two mechanical connections to the flexure are most easily made from one side. However, the structure is such that normal mounting may be employed so that connections can be made from opposite sides. The device of the present invention is particularly suited for supporting long, cylindrical objects which may extend through a bored out central portion of the device. When so used, the device takes up a minimum amount of the surrounding space and presents a very compact appearance.

Another feature of the present invention is that it is easily modifiable so that the flexural axes can be shifted off the geometric center of the device. Either one or both of the axes can be so shifted. Further, it is not necessary that both axes have the same compliance so that it is easy to modify the device so that one axis has more rigidity than the other.

Other objects and advantages of the present invention will be brought out in the balance of the specification.

BRIEF DESCRIPTION OF THE DRAWINGS

FIG. 1 is a perspective view of a flexure embodying the present invention showing its use to mount a cylindrical object. (An additional support at far end of item 20 is omitted for clarity).

FIG. 2 is a perspective view of three flexures of another embodiment of the present invention, showing how they are used to mount three magnetometers. (Again, the supports at the far end of the magnetometers are not shown).

FIG. 3 is an enlarged perspective view of the flexure shown in FIG. 1.

FIG. 4 is a cut-away view of the line 4—4 of FIG. 3.

FIG. 5 is an end view of the device shown in FIG. 3.

FIG. 6 is a section on the line 6—6 of FIG. 5.

FIG. 7 is a side view of the device shown in FIG. 3.

DESCRIPTION OF THE PREFERRED EMBODIMENTS

Figure 8:
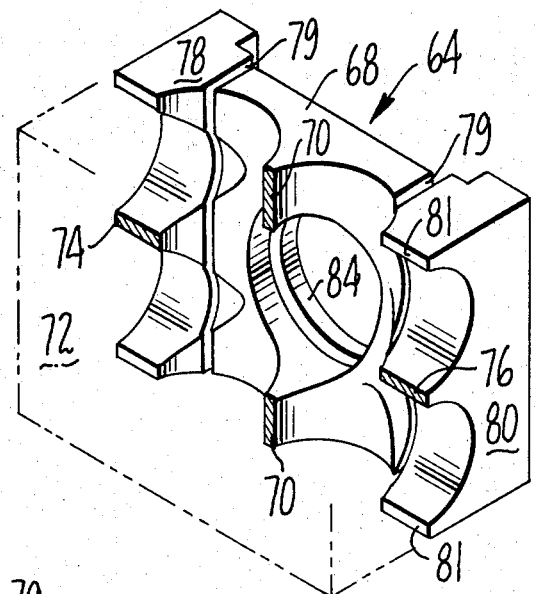
FIG. 8 is an enlarged perspective view of the type of flexure shown in FIG. 2 with certain of the parts cut away.

In that embodiment of the invention shown in FIGS. 1 and 3 through 7, one flexural axis is shifted from the center of the flexure device, as is often desirable if it is predicted that the bending node of the object being tested will not be on the center line of the flexure.

The flexure is generally designated 12 and in FIG. 1 it is shown mounted on the tines 14 and 16 of a sting 18. An object under test, designated 20 is shown mounted at the center of the flexure. As will be later apparent, the flexure gives angular freedom of movement about the X axis designated 22 and the Y axis 24, but does not allow translation nor does it allow rotation about the third non-depicted orthogonal axis. In other words, the model can pitch or yaw but cannot roll or move as a whole in any direction.

The actual structure of the flexure is best shown in FIGS. 3 through 7. Although the device of the present invention is ordinarily made by drilling and sawing and sometimes milling a single block of material, it will be convenient to identify the various parts of the device as if they were individual units. Thus, the flexure 12 includes a base member 26 which is connected by means of webs 28 to a top member 30. The top member 30 is in turn connected to the two side members 32 and 34 by means of the webs 36 and 38 respectively. Slots 27 and 29 are provided between base 26 and sides 32 and 34, while a similar slot 31 is provided between top 30 and the sides. The width of these slots determines the amount of movement possible and serve as limit stops. The base member 26 may have a hole 40 therein for the attachment of the model or the base member 26 might be solid and a connection made directly to the face of the base 26. In the embodiments shown, the top 30 has a hole 42 therein but it will be understood that this is merely a clearance hole and that normally the top 30 should be completely free of any attachments. In the application of the device shown in FIG. 1, the model 20 is fastened to the hole 40 in base 26 but it is completely free of hole 42 in top 30.

The two mechanical connections to the flexure are to the side members 32 and 34 for one of the connections and to the base member 26 for the other connection. Thus, in the application shown in FIG. 1, sides 32 and 34 are rigidly connected to a plate 44 carried on tines 14 and 16. The other mechanical connection is between the model 20 and the base 26.

It will be obvious from a study of the drawings that the entire device can ordinarily be made by simple drilling and sawing operations. In many embodiments, the drilling can go completely through the block from which the flexure is made. In some applications, it is not possible to drill completely through the block. For instance, in the embodiment shown in FIGS. 3 through 7 and referring specifically to FIG. 4, holes 45 and 47 could not be drilled completely through the block because of web 28 and must be drilled in from each side. On the other hand, the holes 49 and 50 could be drilled completely through the block since they are clear of the webs 36 and 38. Obviously had the block been made square rather than rectangular, all of the holes could be drilled directly through the block.

In some applications of the invention, some milling operations are necessary. For instance, in the application shown in FIG. 1, the ends 32 and 34 were mounted on a plate 44 and it is obvious that the base 26 must be clear of the plate. Thus, base portion 26 was milled away so that it does not extend out as far as the ends 32 and 34, allowing clearance with the mounting plate. This milling is not, of course, necessary if the ends are mounted directly on the tines of a fork or other device which gives the necessary clearance for the base portion.

As has been mentioned earlier, in this embodiment of the invention, one axis was shifted from the geometric center of the flexure since it was predicted that bending movement about the X axis would be above the geometric center. As can best be seen in FIG. 6, the webs 36 and 38, which determine the bending point on the Y axis, are located substantially above the geometric center, while the webs 28 which determine the bending point on the X axis are at the geometric center. The bending point for both axes could have been offset had this been desired.

It will be seen that the structure of the present invention provides inherent limit stops. The limit of the bending is determined by the size of the kerf of the saw used for slotting, so the amount of bending can be easily governed by the thickness of the kerf and thus of the resulting slots. It will be obvious also that the flexure is extremely stiff in the four remaining degrees of freedom and also is very strong when the stop limit is reached.

Figure 9:
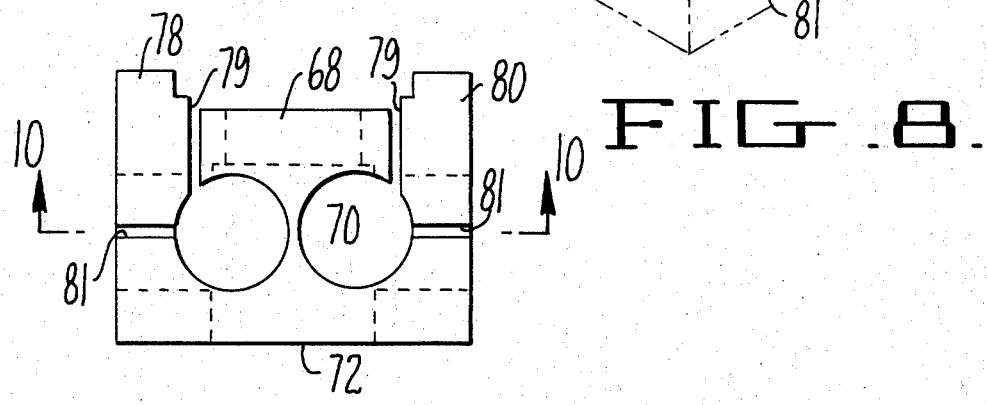
FIG. 9 is an end view of the device shown in FIG. 8.
Figure 10:
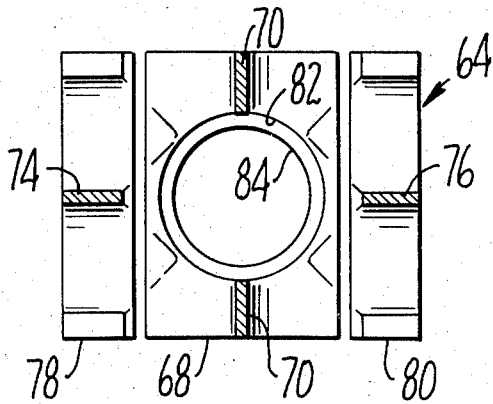
FIG. 10 is a section on the line 10—10 of FIG. 9.
Figure 11:
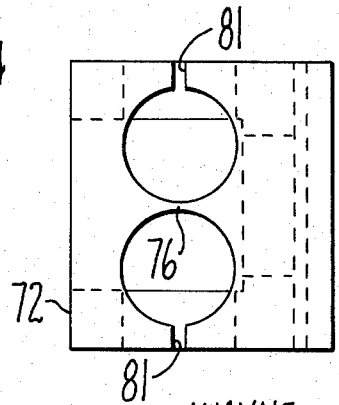
FIG. 11 is a side view of the device shown in FIG. 8.

In that embodiment of the invention shown in FIGS. 2 and 8 through 11, a symmetrical device is shown wherein both the X and the Y axes are at the geometric center of the flexure. Here three identical flexures designated 52, 54, and 56 are mounted on a sleeve 60 and are used to support three magnetometers designated 62, 63, and 66. It will be seen that the connections are inverted, that is, the connections to the magnetometer and to the support structure both extend from the same side of the flexure.

One of the flexures 64 is shown in detail in FIGS. 8 through 11. The flexure consists of the same general part as detailed before, namely, a base 68 connected by webs 70 to a top 72 which is in turn connected by means of webs 74 and 76 to ends 78 and 80 respectively. It will be seen that here both the X and Y axes lie on the geometric plane of the structure. It will also be seen that the hole 82 in the top is considerably larger than the hole 84 in the bottom. Thus, the magnetometer 62 fits snuggly in the hole 84 yet is clear of the top 72. Slots 79 form limit stops for one axis while slots 81 form limit stops for the other axis.

Since all parts of the flexure are ordinarily made from a single piece of material, the thermal stability of the structure is excellent. The flexure can be made of various materials such as plastic or metal. It can be easily manufactured without special jigs fixtures and is on extremely low cost. It has great stiffness in the four remaining degrees of freedom and great strength when stressed beyond the limit of the stops.

Basically the flexure of the present invention is an inverted device in that connections can easily be made to one side. However, connections can be made from opposite sides as can easily be visualized from FIGS. 1 and 2. The device is particularly suitable for supporting long, cylindrical objects which may extend through the bored out top of the device. When so used the flexure takes up a minimum amount of the surrounding space and presents a very compact appearance. Additionally, by surrounding the device, the device under test is given a degree of protection. The flexure is particularly suitable for supporting and testing non-rigid devices such as the model 20 shown in FIG. 1 which was expected to flex and otherwise deform under the test conditions. The compliance of the flexure is determined by the thickness of the webs which in turn is controlled by the placement and/or the size of the holes which are drilled. Although in the embodiment shown, the X and Y axes webs were of substantially the same thickness under some test conditions, these could be different.

The device of the present invention can be fabricated in various ways. It can be made by drilling and sawing or by milling or other material working methods. It can also be made by casting.

I claim:

1. A two axis pivot composed of a single piece of an elastic material having two spaced end members with a base member located between said end members and spaced therefrom, a top member forming a connection between said end members and said base member, said connections consisting of a first pair of thin webs connecting said end members to said top member and a second pair of thin webs connecting said top member to said base member, said first and second webs being at right angles to each other lying on a single plane, whereby a first mechanical connection can be made to said end members and a second mechanical connection can be made to said base member whereby said first and second connections can flex independently on two axes and be held rigid on all other axes.

2. The structure of claim 1 wherein two axis pivot is constructed from a single piece of elastic material by forming two holes parallel to the said base member between said base member and said top member leaving a thin web therebetween to provide flexing on one axis and having two similar holes formed at right angles to said first two holes, forming therebetween a thin web for flexure on the second axis and having thin cutout portions on each corner of the device interconnecting adjacent corner holes, said cutouts permitting flexing on the webs and serving to form limit stops.

3. The structure of claim 1 wherein at least one of said first and second pairs of thin webs is displaced from the geometric axes of the flexure.

4. The structure of claim 1 wherein both the first pair and the second pair of thin webs lie on the geometric center of the flexure.

5. The structure of claim 1 wherein said top member has an opening therein, said opening providing a clearance for a mechanical connection extending through said top member and being connected to said base.

6. The structure of claim 1 wherein mechanical connections are provided extending outwardly from said end members and said base members in the same direction.

* * * * *